US008694805B2

(12) United States Patent
Hussain et al.

(10) Patent No.: US 8,694,805 B2
(45) Date of Patent: *Apr. 8, 2014

(54) SYSTEM AND METHOD FOR MULTIPLE POE POWER SUPPLY MANAGEMENT

(75) Inventors: Asif Hussain, Tustin, CA (US); Sesha Thalpasai Panguluri, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 318 days.

This patent is subject to a terminal disclaimer.

(21) Appl. No.: 13/041,847

(22) Filed: Mar. 7, 2011

(65) Prior Publication Data

US 2011/0161692 A1 Jun. 30, 2011

Related U.S. Application Data

(63) Continuation of application No. 11/861,861, filed on Sep. 26, 2007, now Pat. No. 7,908,494.

(51) Int. Cl.
*G06F 1/00* (2006.01)

(52) U.S. Cl.
USPC ........................................... 713/300

(58) Field of Classification Search
USPC ........................................ 713/300; 714/14
See application file for complete search history.

(56) References Cited

U.S. PATENT DOCUMENTS

| 7,478,251 | B1 | 1/2009 | Diab et al. | |
|---|---|---|---|---|
| 7,908,494 | B2 * | 3/2011 | Hussain et al. | 713/300 |
| 2002/0163255 | A1 * | 11/2002 | Soo et al. | 307/52 |
| 2004/0158771 | A1 * | 8/2004 | Garnett et al. | 714/14 |
| 2005/0272402 | A1 | 12/2005 | Ferentz et al. | |
| 2006/0053324 | A1 | 3/2006 | Giat et al. | |
| 2006/0259792 | A1 | 11/2006 | Dove | |
| 2007/0237322 | A1 | 10/2007 | Hussain et al. | |
| 2007/0250218 | A1 * | 10/2007 | Culley | 700/295 |
| 2008/0147923 | A1 * | 6/2008 | Renahy et al. | 710/62 |
| 2008/0294917 | A1 * | 11/2008 | Khan et al. | 713/310 |

* cited by examiner

*Primary Examiner* — Kim Huynh
*Assistant Examiner* — Brandon Kinsey
(74) *Attorney, Agent, or Firm* — Duane S. Kobayashi

(57) ABSTRACT

A system and method for multiple power over Ethernet (PoE) power supply management. Power supply status signals indicative of an operating condition of a plurality of PoE power supplies are provided to a plurality of power sourcing equipment (PSE) controller chips. Pre-configured combination logic within each of the PSE controller chips converts an indicated operational state of the plurality of PoE power supplies into a powering decision for each of the Ethernet ports served by the PSE controller chip within one microsecond.

20 Claims, 6 Drawing Sheets

SYSTEM AND METHOD FOR MULTIPLE POE POWER SUPPLY MANAGEMENT

This application is a continuation of non-provisional patent application Ser. No. 11/861,861, filed Sep. 26, 2007, which is incorporated by reference herein, in its entirety, for all purposes.

BACKGROUND

1. Field of the Invention

The present invention relates generally to Power over Ethernet (PoE) and, more particularly, to a system and method for multiple PoE power supply management.

2. Introduction

The IEEE 802.3af and 802.3 at PoE specifications provide a framework for delivery of power from power sourcing equipment (PSE) to a powered device (PD) over Ethernet cabling. Various types of PDs exist, including voice over IP (VoIP) phones, wireless LAN access points, network cameras, computing devices, etc.

In the PoE process, a valid device detection is first performed. This detection process identifies whether or not it is connected to a valid device to ensure that power is not applied to non-PoE capable devices. After a valid PD is discovered, the PSE can optionally perform a power classification. In 802.3af, the power classification process can be used to classify a PD into various pre-defined power levels (i.e., 4.0 W, 7.0 W, and 15.4 W).

In more advanced power classification schemes, a dynamic power management process can be used to generate a power request and priority for a PD based on current or anticipated power needs. As the total PSE power budget is typically limited as compared to the total power demand of the set of PDs, the dynamic power management process would consider the competing power needs of the various PDs.

The goal of the PSE management task is to provide stable output power to the various PDs. In a conventional PSE design, multiple power supplies can be used. A benefit of such a multiple power supply design is the elimination of a single point of failure. What is needed, however, is a mechanism for managing the allocation of power to a plurality of PDs based on the relative status of the multiple power supplies.

SUMMARY

A system and/or method for multiple PoE power supply management, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
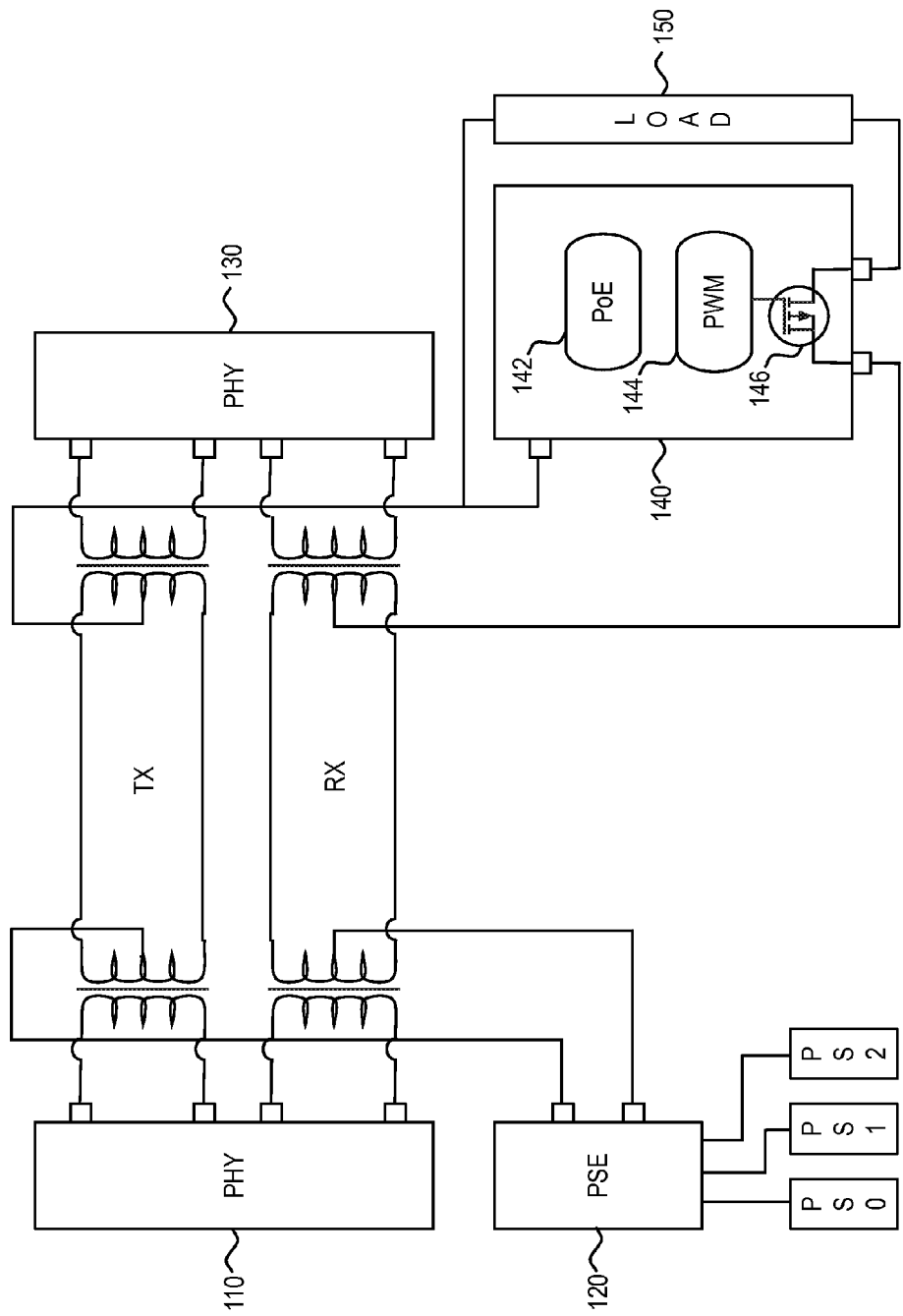
FIG. 1 illustrates an embodiment of a PoE system.

FIG. 1 illustrates an embodiment of a power over Ethernet (PoE) system. As illustrated, the PoE system includes power sourcing equipment (PSE) 120 that transmits power to powered device (PD) 140. Power delivered by the PSE to the PD is provided through the application of a voltage across the center taps of transformers that are coupled to a transmit (TX) pair and a receive (RX) pair of wires carried within an Ethernet cable. In general, the TX/RX pair can be found in, but not limited to structured cabling. The two TX and RX pairs enable data communication between Ethernet PHYs 110 and 130 in accordance with 10BASE-T, 100BASE-TX, 1000BASE-T, 10 GBASE-T and/or any other layer 2 PHY technology.

As is further illustrated in FIG. 1, PD 140 includes PoE module 142. PoE module 142 includes the electronics that would enable PD 140 to communicate with PSE 120 in accordance with a PoE standard such as IEEE 802.3af, 802.3 at, legacy PoE transmission, or any other type of PoE transmission. PD 140 also includes pulse width modulation (PWM) DC:DC controller 144 that controls power FET 146, which in turn provides constant power to load 150.

In the example of the IEEE 802.3af standard, PSE 120 can deliver up to 15.4 W of power to a plurality of PDs (only one PD is shown in FIG. 1 for simplicity). In the IEEE 802.at draft specification, on the other hand, a PSE may be able to deliver up to 30 W of power to a PD over 2-pairs. Other proprietary solutions can potentially deliver even higher levels of power to a PD. In general, high power solutions are often limited by the limitations of the cabling.

In one embodiment, multiple power supplies PS0, PS1, PS2, ... PSN can be used to provide power to the PoE system. In one implementation, this set of power supplies is connected to all of the PSEs. In another implementation, each PSE is connected to an identifiable subset of the power supplies. Consider, for example, a PoE system that supports 48 ports using 12 quad controller PSEs. In this example, PSE1 can be coupled to power supplies PS0, PS1, PS2, PSE2 can be coupled to power supplies PS0, PS3, PS4, and PSE3 can be coupled to power supplies PS4, PS5, PS6. In general, any combination of power supplies to a given PSE can be used.

One of the responsibilities of the PSEs is to manage the power that is supplied to the various supported PDs based on the status of the multiple connected power supplies. In the example of FIG. 1, PSE 120 is shown as being coupled to three power supplies PS0, PS1, PS2. If PS0, PS1, and PS2 are all up, then the maximum amount of power is available to PSE 120. Assume at that point, that PSE 120 has enough power for four PDs (PD1, PD2, PD3, PD4) at respective power levels PL1, PL2, PL3, PL4. If power supply PS1 fails, an adjustment of the power allocation amongst PD1, PD2, PD3, and PD4 may be required. This process would consider the power priorities for PD1, PD2, PD3, and PD4 along with the power priorities for any other PDs that are supported by a PSE coupled to power supply PS1. For example, if only a second PSE (supporting PD5, PD6, PD7, and PD8 at power levels PL5, PL6, PL7, and PL8) is coupled to PS1, then the power management process would consider the power priorities of PD1-PD8. The lowest priority PDs having a total power level equivalent to the reduction in power would then be cut off from receiving any more power.

Figure 2:
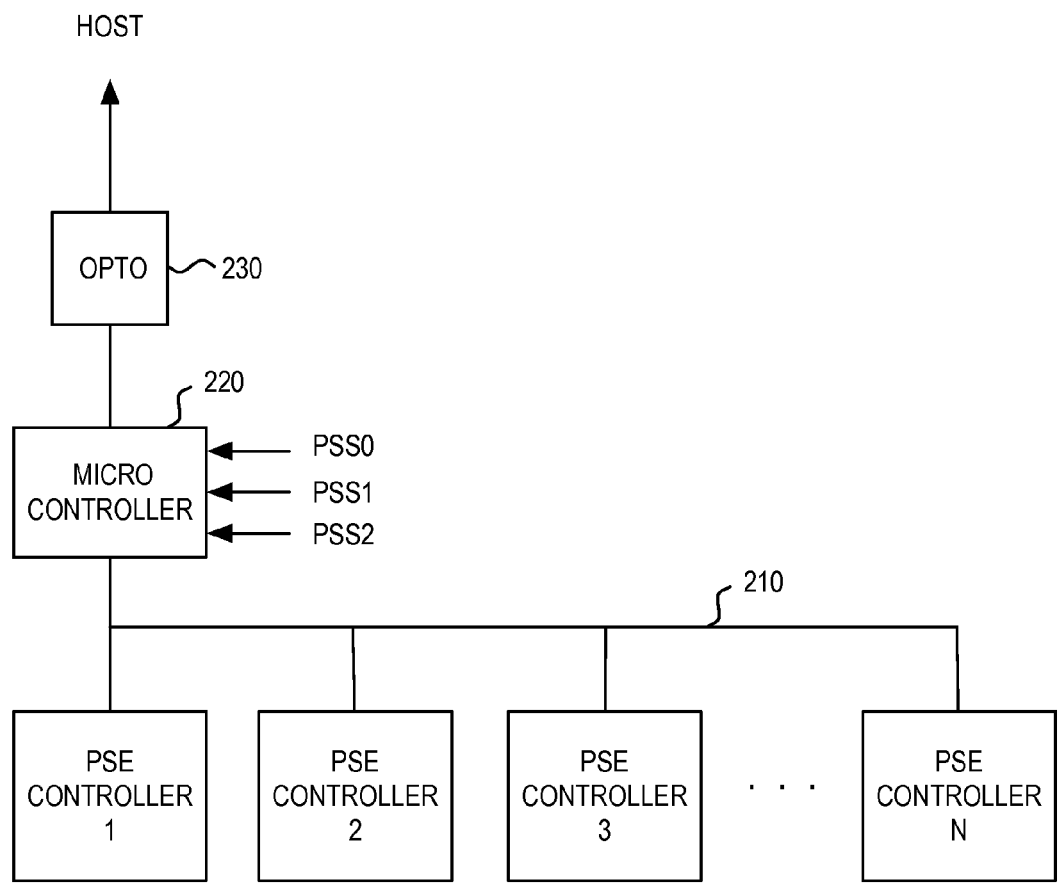
FIG. 2 illustrates an embodiment of a microcontroller that receives power supply status signals.

FIG. 2 illustrates an embodiment of a PoE system that enables management of multiple power supplies. As illustrated, the PoE system includes PSE controllers 1-N. Each PSE controller supports a set of PDs. In this configuration, PSE controllers 1-N are each coupled to bus 210 (e.g., I2C), which is coupled to microcontroller 220. Here, microcontroller can operate as a master device, while PSE controllers 1-N can operate as slave devices. Microcontroller 220 is coupled to a host device through opto 230, which provides an isolation boundary.

As illustrated, microcontroller 220 receives power supply status signals PSS0, PSS1, PSS2, which each provide power supply status information for a given power supply. In this example, it is assumed that only three power supplies PS0, PS1, PS2 are used for the PoE system. In various examples, the power supply signals can represent power supply outputs, "power good" signals, or the like.

When power supply status signals PSS0, PSS1, PSS2 indicate that power supplies PS0, PS1, PS2 are up and running, PSE controllers 1-N can be configured to provide power to a first set of PDs. If power supply PS1 fails, an indication of such a failure would be reflected by power supply signal PSS1. At that point, a reallocation of power amongst the plurality of supported PDs would occur. Implementation of this determined reallocation would then be implemented by microcontroller 220 in the reprogramming of various PSE controllers to account for the new power budget. A disadvantage of such a technique is the significant time required for the reprogramming of the PSE controllers. During such a reconfiguration time, disruption in PoE service can occur.

Figure 3:
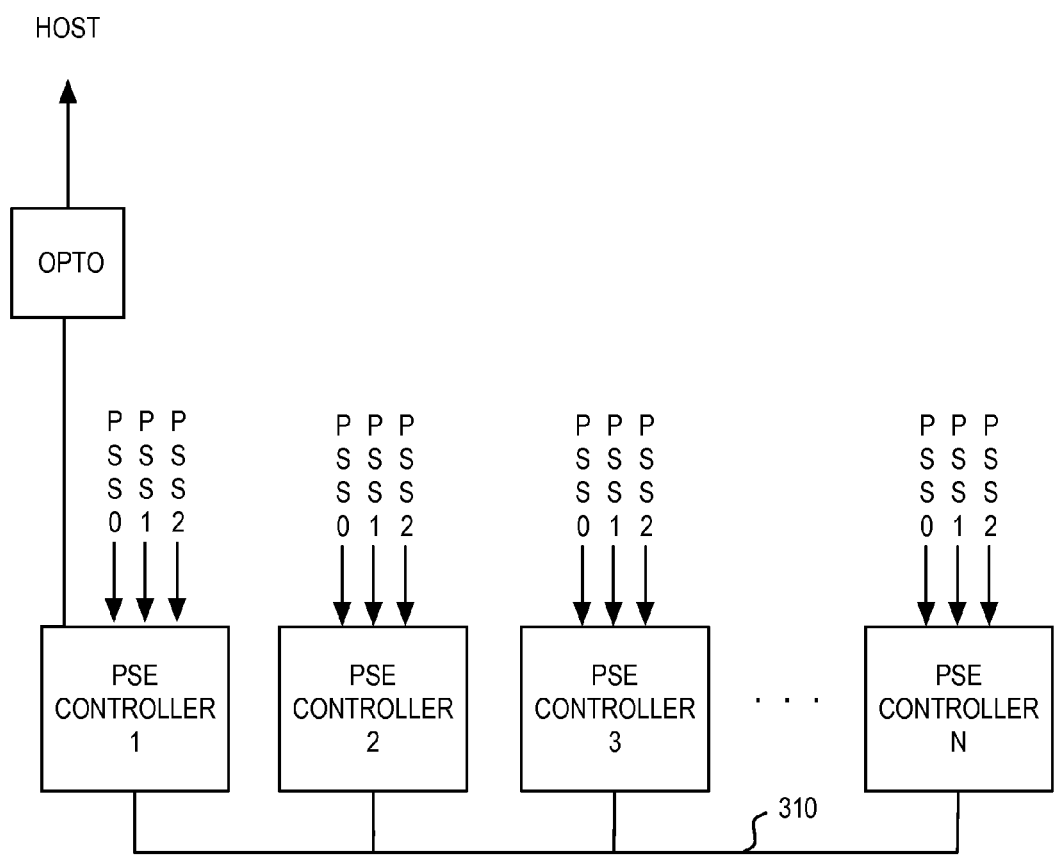
FIG. 3 illustrates an embodiment of PSE controllers that receive power supply status signals.

FIG. 3 illustrates an embodiment of the present invention that enables disconnection of ports without reprogramming of the PSE controllers. In this embodiment, each of PSE controllers 1-N have an integrated microcontroller, thereby obviating the need for an external microcontroller. As such, one of the PSE controllers (e.g., PSE controller 1) can operate as a master device, while the remaining PSE controllers (2-N) can operate as slave devices. Communication between PSE controllers 1-N is facilitated by bus 310.

In the configuration of FIG. 3, each of PSE controllers 1-N is designed to receive power supply status signals PSS0, PSS1, PSS2, which relate to the status of power supplies PS0, PS1, PS2. In operation, power supply status signals PSS0, PSS1, PSS2 function as an enable signal for internal pre-configured registers (or software function), which when configured as unmasked will disconnect the specified port(s) for the active combination. In one embodiment applied to quad PSE controllers, each PSS0, PSS1, PSS2 combination would be associated with a 4-bit mask, wherein each bit is associated with an individual PD port. Each PSE controller would have its own 4-bit mask that would apply for the four associated ports.

In the current example, the power supply status signals have the following combinations where a "0" indicates that a power supply is down and a "1" indicates that a power supply is up.

| PSS0 | PSS1 | PSS2 |
|------|------|------|
| 0 | 0 | 0 |
| 0 | 0 | 1 |
| 0 | 1 | 0 |
| 0 | 1 | 1 |
| 1 | 0 | 0 |
| 1 | 0 | 1 |
| 1 | 1 | 0 |
| 1 | 1 | 1 |

Each of these PSS0, PSS1, PSS2 combinations trigger pre-configured registers in each PSE controller that take into account port priorities (e.g., 0-3). In general, higher priority ports are powered up first to use up an available power budget and lower priority ports are disconnected first to accommodate an oversubscribed power budget. In the configuration process, the bit masks for each PSS0, PSS1, PSS2 combination are created by identifying the ports that should be powered for a given power PSE budget as dictated by the available power supplies.

In one embodiment, the ports are examined for the highest priority level (e.g., 3) from the lowest to the highest numbered port (e.g., port 0 to port 47). This examination would then continue at the next highest priority level (e.g., 2) from the lowest to the highest numbered port. The process would continue until the lowest priority level is reached and all ports are examined. In this process, the sequentially identified ports from highest to lowest priority are identified until the power budget dictated by the combination of available power supplies is reached. At that power supply combination, each identified port that can be powered is associated with a masked bit for the serving PSE controller, while each remaining ports that cannot be powered is associated with an unmasked bit for the serving PSE controller. The end result at that power supply combination is a bit mask for each PSE controller that identifies which ports are powered and which ports are not powered. The configuration process would be repeated for each power supply combination to produce bit masks for each PSE controller at every power supply combination.

In the current example, the configuration process is based on priority levels. As would be appreciated, the configuration process can be based on any priority or other derating information that would be applicable to the power management process.

The end result of the configuration process is a set of pre-configured bit masks for each PSE controller that would be individually selectable based on the power supply combination indicated by the power supply status signals. In one embodiment, these pre-configured bit masks can be implemented as pre-configured registers (or software function) for use by the PSE controllers. To illustrate the use of such bit masks, a brief description of the transition between example combinations is provided below.

Combination (111) indicates that all three power supplies PS0, PS1, PS2 are up and running and PSE controllers 1-N allocate power according to the bit masks associated with combination (111). If PS2 fails, then combination (111) goes to combination (110). The global power management modules within the PSE controllers would then access the bit masks associated with combination (110) and power down the additional ports having an unmasked bit. In one embodiment, the global power management modules are implemented in firmware within the PSE controllers.

For example, assume that PSE controller 1 has a 4-bit mask for combination (111) of 1110 and a 4-bit mask for combination (110) of 1010. Here, a "1" is a masked bit, and a "0" is an unmasked bit. The 4-bit mask 1110 for combination (111) would indicate that when power supplies PS0, PS1, PS2 are all up, ports 0-2 would be powered and port 3 would not be powered. The 4-bit mask 1010 for combination (110), on the other hand, would indicate that when power supply PS2 fails, ports 0 and 2 would be powered and ports 1 and 3 would not be powered. In the transition from combinations (111) to combination (110), the global power management module in PSE controller 1 would determine that port 1 in addition to port 3 would not be powered.

As noted, combination (110) indicates that power supplies 0 and 1 are up and running. If power supply 0 fails, then combination (110) would transition to combination (010). Assume that PSE controller 1 has a 4-bit mask of 1010 for combination (010). In this example, the global power management modules within PSE controller 1 would then access the bit mask associated with combination (010). In this example, the 4-bit mask for combination (110) is the same as the 4-bit mask for combination (010). The global power management module in PSE controller 1 would therefore know that no changes to the powering of the ports served by PSE controller 1 would be required. As such, the impact of the transition between combination (110) to combination (010) would be felt by ports served by one or more of the remaining PSE controllers.

For example, assume that PSE controller 2 has a 4-bit mask of 1xxx for combination (110) and a 4-bit mask of 0xxx for combination (010). In the transition from combination (110) to combination (010), the impact would be felt by port 0 of PSE controller 2. Here, port 0 would be powered down based on an identification of an unmasked bit at the first position of the 4-bit mask 0xxx for combination (010).

If at some point, PS0 comes back on line, then combination (010) goes back to combination (110). In the above example, the global power management module within PSE controller 2 would then access the 4-bit mask associated with combination (110) and power up port 0 based on an identification of a masked bit at the first position of the 4-bit mask 1xxx.

As this example illustrates, the changes in combination based on the change in status of the power supplies can lead to rapid connection/disconnection of ports for each of the PSE controllers. This rapid connection/disconnection of ports is facilitated by the receipt of power supply status signals directly by each PSE controller. Upon detection of changes in state of a power supply, the individual PSE controllers can then connect/disconnect ports through the guidance of pre-configured combination logic within the PSE controllers. Response time to changes in power supply state is therefore improved as reprogramming of the PSE controllers would not be required. With the principles of the present invention, response time to changes in power supply status can occur in approximately 1 μs.

Figure 4:
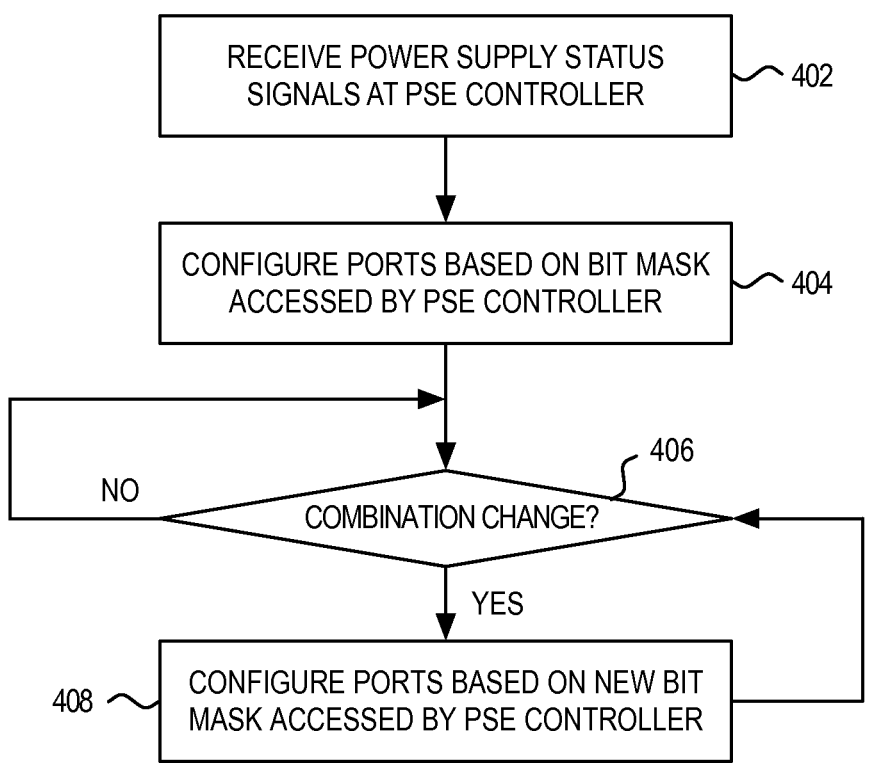
FIG. 4 illustrates a flowchart of a management process in a PoE system having multiple power supplies.

To further illustrate the power supply management process of the present invention reference is now made to the flowchart of FIG. 4. As illustrated, the process begins at step 402 where power supply status signals are received at a PSE controller. As noted above, the power supply status signals are received directly by each PSE controller. This is in contrast to conventional systems that receive the power supply status signals at a single external microcontroller.

Based on the receipt of a set of power supply status signals, the PSE controller would then access a bit mask associated with the combination indicated by the power supply status signals. At step 404, the PSE controller would then configure the ports (i.e., powered or not powered) based on the logic presented by the pre-configured bit mask that is accessed.

The process then proceeds to step 406, where it is determined whether a change has occurred in the combination reflected by the received power supply status signals. If it is determined at step 406, that a change in combination has occurred, then the pre-configured bit mask associated with the new combination is accessed. At step 408, the ports are then configured in accordance with the new bit mask. Here, it should be noted that the new bit mask may be identical to the bit mask of the previous combination. In this case, the combination logic would not produce any changes in the powered/non-powered configuration of the ports. If, on the other hand, the new bit mask is different than the bit mask of the previous combination, then the PSE controller would change the powered/non-powered status of at least one of the ports. In general, the process of FIG. 4 would continue through the detection of various combination changes as indicated by the power supply status signals. Throughout this process, reprogramming of the PSE controllers would not be required.

Figure 5:
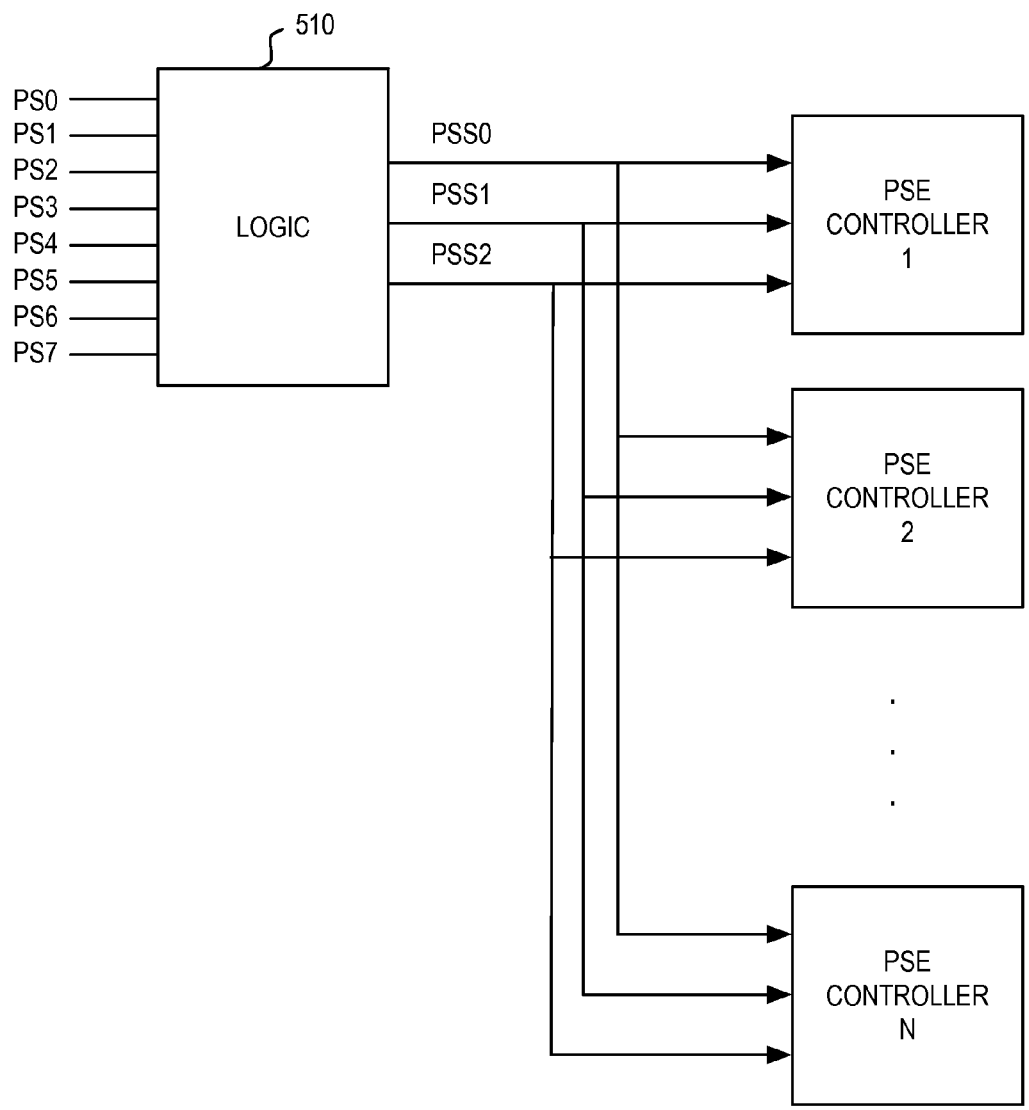
FIG. 5 illustrates an embodiment of a mechanism that generates power supply status signals.

In the example embodiments described above, the power supply status signals are associated with a single power supply. For example PSS1 can be associated with the status of PS1. In one embodiment, the power supply status signals are not associated directly with the status of a particular power supply. FIG. 5 illustrates an example of such an embodiment that is applied to a system having eight power supplies PS1-PS8. In the illustrated example, the status of the eight power supplies PS0-PS7 are provided as inputs to logic block 510. In various embodiments, logic block 510 can be embodied as a complex programmable logic device (CPLD), field programmable gate array (FPGA), or the like. In general, logic block 510 is operable to convert the status indications of power supplies PS0-PS7 into power supply status signals PSS0, PSS1, PSS2. Power supply status signals PSS0, PSS1, PSS2 would then be provided as inputs to each of PSE controllers 1-N. In one example, logic block 510 would be designed to indicate how many of the eight power supplies PS0-PS7 are available through the logic level of the three power supply status signals PSS0, PSS1, PSS2. For example, power supply status signals PSS0, PSS1, PSS2 can have values 0, 1, 1, respectively, indicating that three out of eight power supplies are operational.

Figure 6:
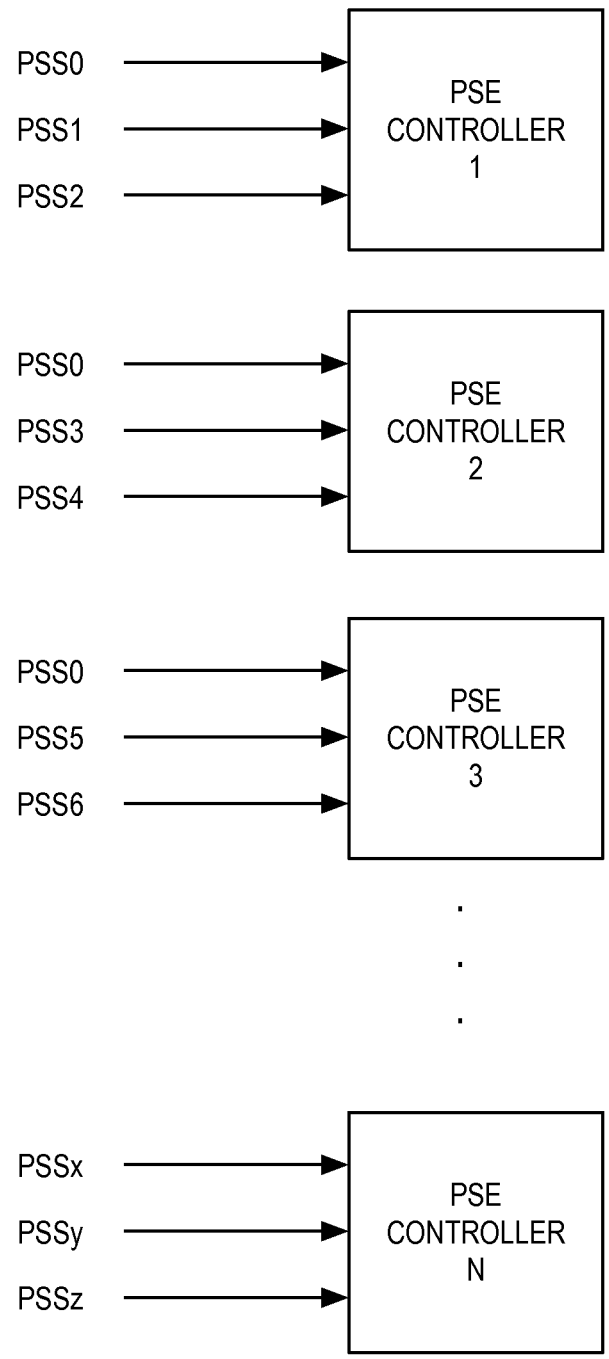
FIG. 6 illustrates another embodiment of PSE controllers that receive power supply status signals.

In one embodiment, the various PSE controllers need not receive the same set of power supply status signals. FIG. 6 illustrates such an example embodiment. As illustrated, PSE controller 1 receives power supply status signals PSS0, PSS1, PSS2, PSE controller 2 receives power supply status signals PSS0, PSS3, PSS4, and PSE controller 3 receives power supply status signals PSS0, PSS5, PSS6. In this configuration, the port configurations for PSE controller 1 would be dependent on power supplies PS0, PS1, PS2, the port configurations for PSE controller 2 would be dependent on power supplies PS0, PS3, PS4, and the port configuration for PSE controllers 2 would be dependent on power supplies PS0, PS5, PS6. In general, each PSE controller can have ports whose powered/non-powered status is dependent on the status of a particular set of power supplies. Example of such customization include the sharing of a particular power supply by ports on different PSE controllers, the exclusive use of a particular power supply by ports on a particular PSE controller, the use of redundant power supplies by ports on one or more PSE controllers, etc.

It should be noted that the use of multiple power supply management can achieve the powering down of lower priority ports in less than 1 microsecond, which therefore saves the PoE system from shutting down due to increased port current or dropping voltage levels.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A system, comprising
a first plurality of power supplies;
a logic block that is configured to receive a power supply status signal from each of the first plurality of power supplies, the logic block being configured to generate a second plurality of status signals based on the first plurality of power supply status signals, wherein the first plurality of power supply status signals is greater in number than the second plurality of status signals, wherein the second plurality of status signals indicate an operational status of more than one of the first plurality of power supplies; and
a controller chip that is configured to receive the second plurality of status signals from the logic block, the controller chip being further configured to control an application of power to a plurality of ports based on an application of pre-defined rules that map the operational status of more than one of the first plurality of power supplies as indicated by the values of the second plurality of status signals to a powering state for the plurality of ports.

2. The system of claim 1, wherein each of the first plurality of power supply status signals indicate an operating condition for a respective one of the first plurality of power supplies.

3. The system of claim 1, wherein the control of the controller chip is based on pre-configured combination logic.

4. The system of claim 1, wherein the control of the controller chip is based on a software module.

5. The system of claim 1, wherein the control of the controller chip is based on a relative power priority levels for the plurality of ports.

6. The system of claim 1, wherein the logic block is a complex programmable logic device.

7. The system of claim 1, wherein the logic block is a field programmable gate array.

8. A power over Ethernet controller chip, comprising:
a first plurality of inputs that are configured to receive a corresponding first plurality of status signals from a logic block, the logic block producing the first plurality of status signals based on a second plurality of power supply status signals, each of the second plurality of power supply status signals being indicative of an operating condition of a respective plurality of power supplies, wherein the first plurality of status signals is less in number than the second plurality of power supply status signals, and indicate an operational status of more than one of the plurality of power supplies; and
a controller that controls an application of power on a plurality of ports based on the first plurality of status signals, wherein the control by the controller is based on an application of pre-defined rules that map the operational status of more than one of the plurality of power supplies as indicated by the values of the first plurality of status signals to a powering state for a plurality of ports.

9. The power over Ethernet controller chip of claim 8, wherein the control is based on pre-configured combination logic.

10. The power over Ethernet controller chip of claim 8, wherein the control is based on a software module.

11. The power over Ethernet controller chip of claim 8, wherein the control is based on a relative power priority levels for the plurality of ports.

12. The power over Ethernet controller chip of claim 8, wherein the logic block is a complex programmable logic device.

13. The power over Ethernet controller chip of claim 8, wherein the logic block is a field programmable gate array.

14. A method, comprising:
receiving, in a logic block, a power supply status signal from each of a corresponding first plurality of power supplies;
generating, by the logic block, a second plurality of status signals based on the first plurality of power supply status signals, wherein the first plurality of power supply status signals is greater in number than the second plurality of status signals and indicate an operational status of more than one of the first plurality of power supplies;
determining, by a controller, a first powering state of a plurality of ports based on the second plurality of status signals, the determination being based on an application of pre-defined rules that map the operational status of more than one of the first plurality of power supplies as indicated by the values of the second plurality of status signals to a powering state for the plurality of ports; and
determining, by the controller, using the pre-defined rules, a second powering state of the plurality of ports upon a change in the second plurality of status signals.

15. The method of claim 14, wherein the change in operating condition of the second plurality of status signals corresponds to a power supply going down.

16. The method of claim 14, wherein the change in operating condition of the second plurality of status signals corresponds to a power supply coming up.

17. The method of claim 14, wherein the pre-defined rules are based on pre-configured combination logic.

18. The method of claim 14, wherein the pre-defined rules are based on a software module.

19. The method of claim 14, wherein the receiving comprises receiving in a complex programmable logic device.

20. The method of claim 14, wherein the receiving comprises receiving in field programmable gate array.

* * * * *